United States Patent  (10) Patent No.: US 8,792,730 B2
Barrus  (45) Date of Patent: Jul. 29, 2014

(54) CLASSIFICATION AND STANDARDIZATION OF FIELD IMAGES ASSOCIATED WITH A FIELD IN A FORM

(75) Inventor: John W. Barrus, Menlo Park, CA (US)

(73) Assignee: Ricoh Co., Ltd., Tokyo (JP)

(*) Notice: Subject to any disclaimer, the term of this patent is extended or adjusted under 35 U.S.C. 154(b) by 218 days.

(21) Appl. No.: 13/414,710

(22) Filed: Mar. 7, 2012

(65) Prior Publication Data

US 2013/0236110 A1 Sep. 12, 2013

(51) Int. Cl.
*G06K 9/62* (2006.01)

(52) U.S. Cl.
USPC .......................................................... 382/224

(58) Field of Classification Search
None
See application file for complete search history.

(56) References Cited

U.S. PATENT DOCUMENTS

| | | | |
|---|---|---|---|
| 7,849,012 B2 * | 12/2010 | Pinsonnault et al. | 705/44 |
| 7,916,946 B2 * | 3/2011 | Hanano | 382/175 |
| 8,290,966 B2 * | 10/2012 | Vignet | 707/754 |
| 8,442,319 B2 * | 5/2013 | Sarkar et al. | 382/180 |
| 2002/0156644 A1 * | 10/2002 | Davies et al. | 705/1 |
| 2006/0159345 A1 * | 7/2006 | Clary et al. | 382/186 |
| 2009/0089653 A1 * | 4/2009 | Campbell et al. | 715/209 |
| 2009/0226090 A1 * | 9/2009 | Okita | 382/187 |

\* cited by examiner

*Primary Examiner* — Daniel Mariam

(74) *Attorney, Agent, or Firm* — Patent Law Works LLP

(57) ABSTRACT

A system and method for processing form images including strokes. A stroke identification module identifies the position of each stroke in each of form image. A geometry engine identifies a group of overlapping strokes from an overlay of the plurality of form images. The geometry engine generates a field bounding box encompassing the group of strokes and generates a field image from each form image based on the field bounding box. A label detector analyzes an area around the field image in the form image and generates a label image. A field image classifier determines stroke features for field images associated with a field. The field image classifier classifies the field images into one or more groups based on the stroke features. A stroke standardizer determines a representative image for field images associated with a field.

20 Claims, 13 Drawing Sheets

300

Last Name _____  First Name _____

DOB _____  SSN# _____

Gender: ☐ Male ☐ Female   Marital Status: ☐ Single ☐ Married
                                          ☐ Widowed ☐ Divorced Dependents: ☐

Employer _____  Title _____

Address

_____

City                State                Zip
_____         _____          _____

Phone               Email
_____         _____

Signature           Date
_____         _____

⬭ → Labels

▭ → Fields

Figure 3

400
401  403
     405
Last Name  Oscar          First Name  Mike  410
DOB  7/12/1986           SSN#  123-45-6789
Gender:  ☒ Male  ☐ Female 413                                    ┌────┐ → Stroke
                                       └────┘   Bounding Box

Figure 4A 440
441
     445
Last Name  Dagon          First Name  Jazz
DOB  12/10/1971           SSN#  987-65-4321
Gender:  ☒ Male  ☐ Female

Figure 4B

480
Last Name  Greene         First Name  Brooke
DOB  11/12/1988           SSN#  123-45-3210
Gender:  ☐ Male  ☒ Female
                          485

Last Name ~~Doe~~ —505  First Name ~~Jake~~ —510
DOB ~~12/12/1982~~ —515  SSN# ~~123-45-6789~~ —520
Gender: ☒ Male ☒ Female
          525        530
—413

Last Name ~~Doe~~ —545  First Name ~~Jake~~ —550
DOB ~~12/12/1982~~ —555  SSN# ~~123-45-6789~~ —560
Gender: ☒ Male ☒ Female
          565        570

[- - -] → Field Bounding Box

Figure 5B

| | Last Name | First Name | DOB | SSN# | Male | Female | ... | Signature | Dependents | Date | Location |
|---|---|---|---|---|---|---|---|---|---|---|---|
| ☐ | Oscar | Mike | 7/12/1986 | ********** | ☒ | ☐ | ... | *sig* | ☒ | 7/12/2011 | Utah |
| ☐ | Dagan | Jazz | 12/10/1971 | ********** | ☒ | ☐ | ... | *sig* | ☒ | 6/07/2011 | Nevada |
| ☐ | Vasuki | LeRoy | 15/05/1984 | ********** | ☒ | ☐ | ... | *sig* | ☒ | 2/05/2010 | Idaho |
| ☐ | Kalata | Elisha | 8/09/1975 | ********** | ☐ | ☒ | ... | *sig* | ☒ | 11/11/2011 | Arizona |
| | ... | ... | ... | ... | ... | ... | ... | ... | ... | ... | ... |
| ☐ | Brown | Gene | 16/11/1983 | ********** | ☒ | ☐ | ... | *sig* | ☒ | 8/10/2009 | Vermont |
| ☐ | Greene | Brooke | 11/12/1988 | ********** | ☐ | ■ | ... | *sig* | 1 | 3/06/2011 | Boston |
| ☐ | Wild | Tom | 12/04/1985 | ********** | ☒ | ☐ | ... | *sig* | ☒ | 1/02/2010 | Utah |

Filter

Figure 6

| | Last Name | First Name | DOB | SSN# | Male | Female | Signature | Dependents | Date | Location |
|---|---|---|---|---|---|---|---|---|---|---|
| ☐ | | | | ☐ | | | ☐ | ☐ | ☐ | ☐ |
| ☐ | Oscar | Mike | 7/12/1986 | ********* | ☒ | ☐ | MB | ☒ | 7/12/2011 | Utah |
| ☐ | Dagon | Jazz | 12/10/1977 | ********* | ☒ | ☐ | Jaz | ☒ | 6/07/2011 | Nevada |
| ☐ | Baush | LeRoy | 15/05/1984 | ********* | ☒ | ☐ | LeRoy | ☒ | 2/05/2010 | Idaho |
| ☐ | Kalata | Elisha | 8/09/1975 | ********* | ☐ | ☒ | Elishw | ☒ | 1/11/2011 | Arizona |
| ⋮ | ⋮ | ⋮ | ⋮ | ⋮ | ⋮ | ⋮ | ⋮ | ⋮ | ⋮ | ⋮ |
| ☐ | Brown | Gene | 16/11/1983 | ********* | ☒ | ☐ | Gene | ☒ | 8/10/2009 | Vermont |
| ☐ | Greene | Brooke | 11/12/1988 | ********* | ☐ | ■ | Brooke | 1 | 3/06/2011 | Boston |
| ☐ | Wild | Tom | 12/09/1985 | ********* | ☒ | ☐ | Tom | ☒ | 7/02/2010 | Utah |

[Filter]

Figure 7A

Browser Window http://www.docmanage.com/

Document Management

Standardized field images

| | Last Name | First Name | DOB | SSN# | Male | Female | Signature | Dependents | Date | Location |
|---|---|---|---|---|---|---|---|---|---|---|
| ☐ | Oscar | Mike | 7/12/1986 | ********** | ☒ | ☐ | wR | 3 | 7/12/2011 | Utah |
| ☐ | Dogon | Jazz | 12/10/1971 | ********** | ☒ | ☐ | Jazz | 2 | 6/07/2011 | Nevada |
| ☐ | Vasuki | B.Ray | 15/05/1984 | ********** | ☐ | ☐ | B.Ray | 2 | 2/05/2010 | Idaho |
| ☐ | Kalatu | Etisha | 8/09/1975 | ********** | ☐ | ☒ | Etishn | 0 | 1/11/2011 | Arizona |
| ... | ... | ... | ... | ... | ... | ... | ... | ... | ... | ... |
| ☐ | Brown | Gene | 16/11/1983 | ********** | ☒ | ☐ | Gene | 2 | 8/10/2009 | Vermont |
| ☐ | Greene | Brooke | 11/12/1988 | ********** | ☐ | ■ | Brooke | 1 | 3/06/2011 | Boston |
| ☐ | Wild | Tom | 12/04/1985 | ********** | ☒ | ☐ | Tom | ☒ | 1/02/2010 | Utah |

740 → (row 4, Male column)

} 705

Filter

| Last Name | First Name | DOB | SSN# | Male | Female | Signature | Dependents | Date | Location |
|---|---|---|---|---|---|---|---|---|---|
| Kalita | Elisha | 8/09/1975 | ********* | ☐ | ■ | Eioln | ☑ | 1/11/2011 | Arizona |
| Greene | Brooke | 11/12/1988 | ********* | ☒ | ☒ | Brooke | ☐ | 3/06/2011 | Boston |
| Vasuki | LeRoy | 15/05/1984 | ********* | ☒ | ☐ | LeRoy | ☑ | 2/05/2010 | Idaho |
| Dagon | Jazz | 12/10/1971 | ********* | | | Jazz | | 6/07/2011 | Nevada |
| ... | ... | ... | ... | ... | ... | ... | ... | ... | ... |
| Brown | Gene | 16/11/1983 | ********* | ☒ | ☐ | Gene | ☑ | 8/10/2009 | Vermont |
| Oscar | Mike | 7/12/1986 | ********* | ☒ | ☐ | Mike | ☒ | 7/12/2011 | Utah |
| Nila | Tom | 12/04/1985 | ********* | ☒ | ☐ | Tom | ☒ | 7/02/2010 | Utah |

Rows sorted based on field images associated with a field

805

850

CLASSIFICATION AND STANDARDIZATION OF FIELD IMAGES ASSOCIATED WITH A FIELD IN A FORM

BACKGROUND OF THE INVENTION

1. Field of the Invention

The present invention relates to processing of forms. More particularly, the present invention relates to systems and methods for processing form images including classifying and standardizing strokes on a table and sorting a field.

2. Description of the Background Art

The use of portable computing devices has become commonplace for many users. In addition to having a conventional desktop computer, many users also have some type of portable computing device. Examples of present-day computing devices include electronic devices for reading such as the Reader from Sony Corp., the Kindle from Amazon and the Nook from Barnes & Noble. As memory size becomes smaller, people are increasingly foregoing laptops for tablets, such as the iPad from Apple Computer Inc., the Kindle Fire from Amazon and the Galaxy Tab from Samsung. Smaller portable computing devices such as smartphones are also useful because of their portability. Smartphones include the iPhone from Apple Computer Inc., the Droid from Motorola and the Blackberry from Research in Motion, just to name a few.

Portable computing devices can be used to input information into forms. Users will input information using a stylus and optical character recognition (OCR) or optical mark recognition (OMR) is applied to the strokes to convert them into text. One particular problem with this prior art approach, however, is that the process of converting the strokes into text is error prone and the user has no way of knowing that the conversion to symbolic data is incorrect. In addition, many items on the forms are needlessly run through the OCR or OMR process when only a certain subset of the strokes needs to be converted. Lastly, the forms are typically processed by identifying the form, extracting information about the fields and performing actions on the form. This process is time consuming, complicated and can easily result in errors. As a result, the prior art provides a very complicated and problematic process for receiving data and analyzing forms.

SUMMARY OF THE INVENTION

The present invention overcomes the deficiencies of the prior art with a system and a method for processing form images including strokes. An Image Based Document Management (IBDM) server includes a controller, a stroke identification module, a geometry engine, a label detector, a table generator, field image classifier, a stroke standardizer, a symbolic representation module, a query engine and a user interface engine. The controller receives a plurality of form images including a plurality of strokes. The stroke identification module identifies the position of each stroke in each of the form images. The geometry engine generates an overlay of the plurality of form images and identifies a group of overlapping strokes from the overlay. The geometry engine then generates a field bounding box encompassing the group of strokes, the field bounding box representing a field in the plurality of form images. The geometry engine then generates a field image from each form image based on the size and position of the field bounding box. In one embodiment, the label detector analyzes an area around the field image in the form image to determine a label and generates a label image. The table generator indexes the label image and the field image with the form image.

In one embodiment, the field image classifier determines stroke features for field images associated with a field. The field image classifier classifies the field images into one or more groups based on the stroke features. In a further embodiment, the field image classifier generates one or more ordinal numbers for the one or more groups. In one embodiment, the stroke standardizer determines a representative image for the field images associated with a field. In one embodiment, the invention includes receiving the plurality of field images associated with a field, determining stroke features for each of the plurality of field image, analyzing the stroke features to determine one or more patterns and classifying the plurality of field images into one or more groups based on the one or more patterns.

In one embodiment, the user interface engine generates graphical data for providing a user interface that includes the field images and the label images in a table. In one embodiment, the query engine instructs the user interface engine to sort the field images in the table based on the ordinal numbers. In another embodiment, the query engine instructs the user interface engine to replace the field images of a field in the table with a representative image.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

FIG. 3 is a graphic representation of an example form.

FIGS. 4A-4C are graphic representations of form images including strokes that are received by the Image Based Document Management server.

FIG. 5A is a graphic representation of an overlay of form images including strokes.

FIG. 5B is a graphic representation of an overlay of form images including field bounding boxes encompassing groups of strokes.

FIG. 6 is a graphic representation of an example table that includes a plurality of form images.

FIG. 7A illustrates a graphic representation of an example user interface for submitting user input to standardize field images.

FIG. 7B illustrates a graphic representation of an example table that includes a field with standardized field images.

FIG. 8B illustrates a graphic representation of an example table that includes form images sorted based on a field.

DETAILED DESCRIPTION OF PREFERRED EMBODIMENTS

Figure 1:
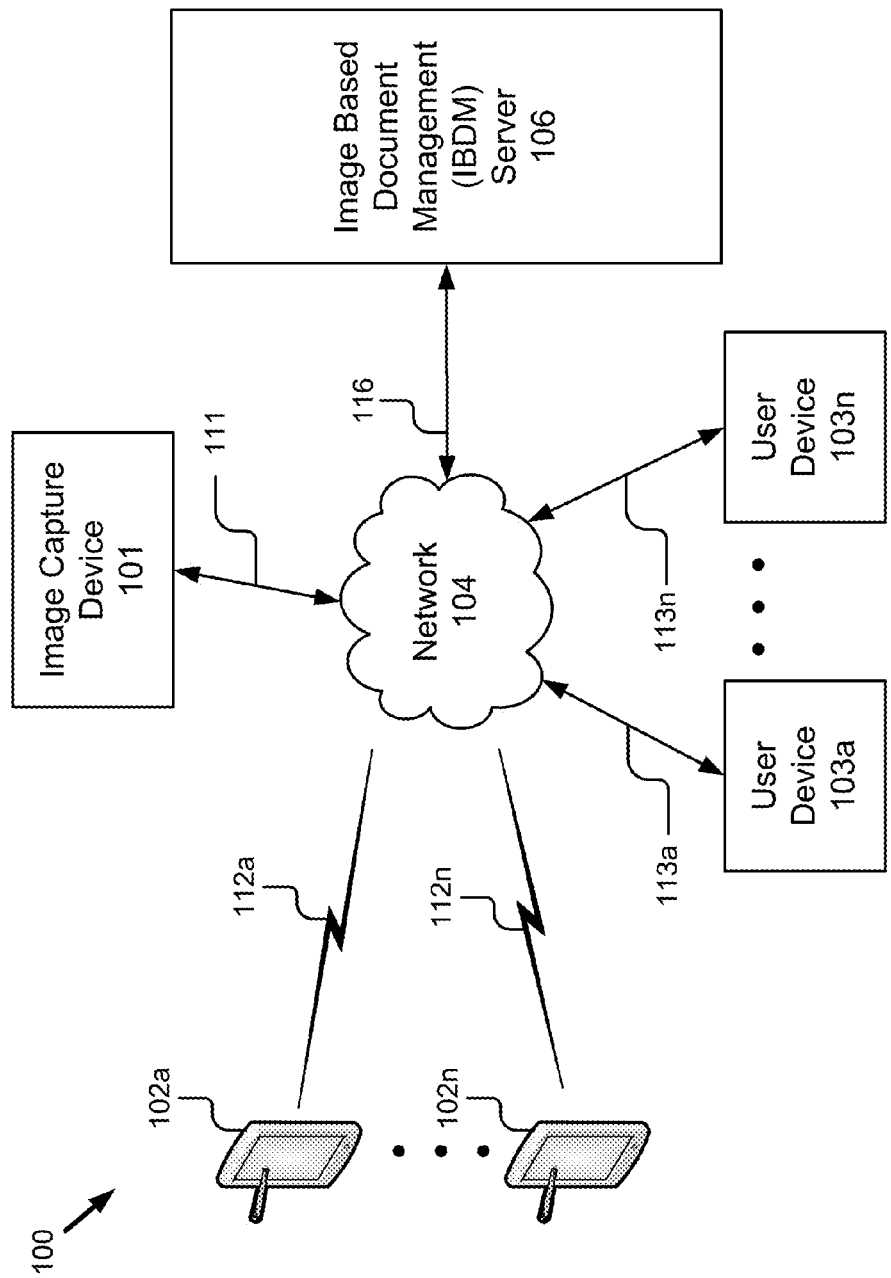
FIG. 1 is a block diagram illustrating one embodiment of a system for processing form images including strokes.

A system for processing form images including strokes is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to portable computing devices that are exemplified in a hardware and software platform such as Ricoh eQuill™. However, the present invention applies to any type of computing device that can capture strokes, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

System Overview

FIG. 1 shows an embodiment of a system 100 for processing form images including strokes. The illustrated embodiment of system 100 comprises: portable computing devices 102a-102n, user devices 103a-103n, an image capture device 101, a network 104 and an Image Based Document Management (IBDM) server 106. In FIG. 1 and the remaining figures, a letter after a reference number, for example "102a" is a reference to the element having that particular reference number. A reference number in the text without a following letter, for example "102," is a general reference to any or all instances of the element bearing that reference number.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc. While only one network 104 is coupled to the plurality of portable computing devices 102a-102n, the plurality of user devices 103a-103n, the image capture device 101 and the IBDM server 106, in practice any number of networks 104 can be connected to the entities.

The portable computing devices 102a-102n are each wirelessly coupled to the network 104 via signal lines 112a-112n respectively. The portable computing device 102 is any computing device including a memory, a processor and wireless communication capability. For example, the portable computing device 102 can be a tablet computer, a personal digital assistant, a smart phone, etc. The portable computing device 102 is adapted to receive form images, add stroke annotations to the form images and send the annotated form images to the IBDM server 106. A form is any document that includes fields (i.e., blank spaces) for insertion of required or requested information. The form when filled out with the requested information may be a statement, an order, a request, etc. For example, a form can be a tax form, an insurance form, a medical form, an electronic check, a job application, a survey, a receipt, etc.

FIG. 3 illustrates an example form 300 that includes a number of fields and the corresponding labels, such as last name, first name, employer, address, signature, etc. Labels are illustrated with small dashes and fields are illustrated with longer dashes. A user fills in a field by inputting strokes above the lines (e.g. printing or writing in cursive) or inputting strokes inside boxes (e.g. checks, x's and circles).

In one embodiment, the portable computing device 102 is a tablet computer including a computing pad and a stylus. The computing pad is adapted to display a form image and capture any strokes written on the form image using the stylus, a finger or other instrument for inputting stroke data. The strokes are typically displayed on top of the form image, just as if written by pen on paper. The computing pad usually captures the strokes as a sequence of points or segments along with location, timing and pressure information. The computing pad sends the form images including the captured strokes in any image format known to persons of ordinary skill in the art, for example, JPEG, JPEG2000, JPM, PNG, PDF, TIFF or simple portable bit map (PBM) file format, etc. The computing pad attaches the information associated with the strokes, for example, the location, the pressure profiles and timing information with the form images as metadata. The metadata can be attached in any format known to persons of ordinary skill in the art, including the Scaled Vector Graphics (SVG) format or the InkML format. The portable computing device 102 determines location information by using global positioning system (GPS) circuitry included within the device itself to determine its location. In one embodiment, the portable computing device 102 accesses a database including pairs of media access control (MAC) addresses and locations over the Internet. To determine a location, the portable computing device 102 only retrieves the location corresponding to the access point MAC address from the database.

The user devices 103a-103n are each coupled to the network 104 via couplings 113a-113n respectively. The user device 103 is any computing device that includes a memory and a processor, for example, a desktop computer, a laptop computer, etc. The user device 103 is adapted for sending and receiving data to and from the IBDM server 106. For example, the user device 103 sends a request for form images to the IBDM server 106. In this example, the user device 103 receives graphical data for displaying the requested form images as a table. The user device 103 is accessed by users that have permission to access information from the IBDM server 106, such as a creator of the form sent to portable computing devices 102 or an administrator of the IBDM server 106.

The image capture device 101 is coupled to the network 104 via signal line 111. Although only one image capture device is illustrated, persons of ordinary skill in the art will recognize that any number of image capture devices 101 can be coupled to the network 104. The image capture device 101 is adapted to capture an image of a printed form that includes strokes filled out using, for example a pen, pencil, etc., and send the printed form image to the IBDM server 106. In one embodiment, the image capture device 101 also sends an unmarked printed form image (i.e., an image of the printed form without any strokes) as metadata along with the captured image to the IBDM server 106. The image capture device 101 is for example, a scanner, a digital camera, a standard cellular camera phone, a webcam, a video recorder, etc.

The IBDM server 106 is coupled to the network 104 via signal line 116. In one embodiment, the IBDM server 106 receives form images including strokes from the plurality of portable computing devices 102a-102n and the image capture device 101, automatically identifies fields and labels in each of the form images and generates a database with field images and label images. Although only one IBDM server 106 is illustrated, persons with ordinary skill in the art will recognize that any number of IBDM servers 106 can be coupled to the network 104. The IBDM server 106 is described in further detail below with reference to FIG. 2.

Image Based Document Management (IBDM) Server 106

Figure 2:
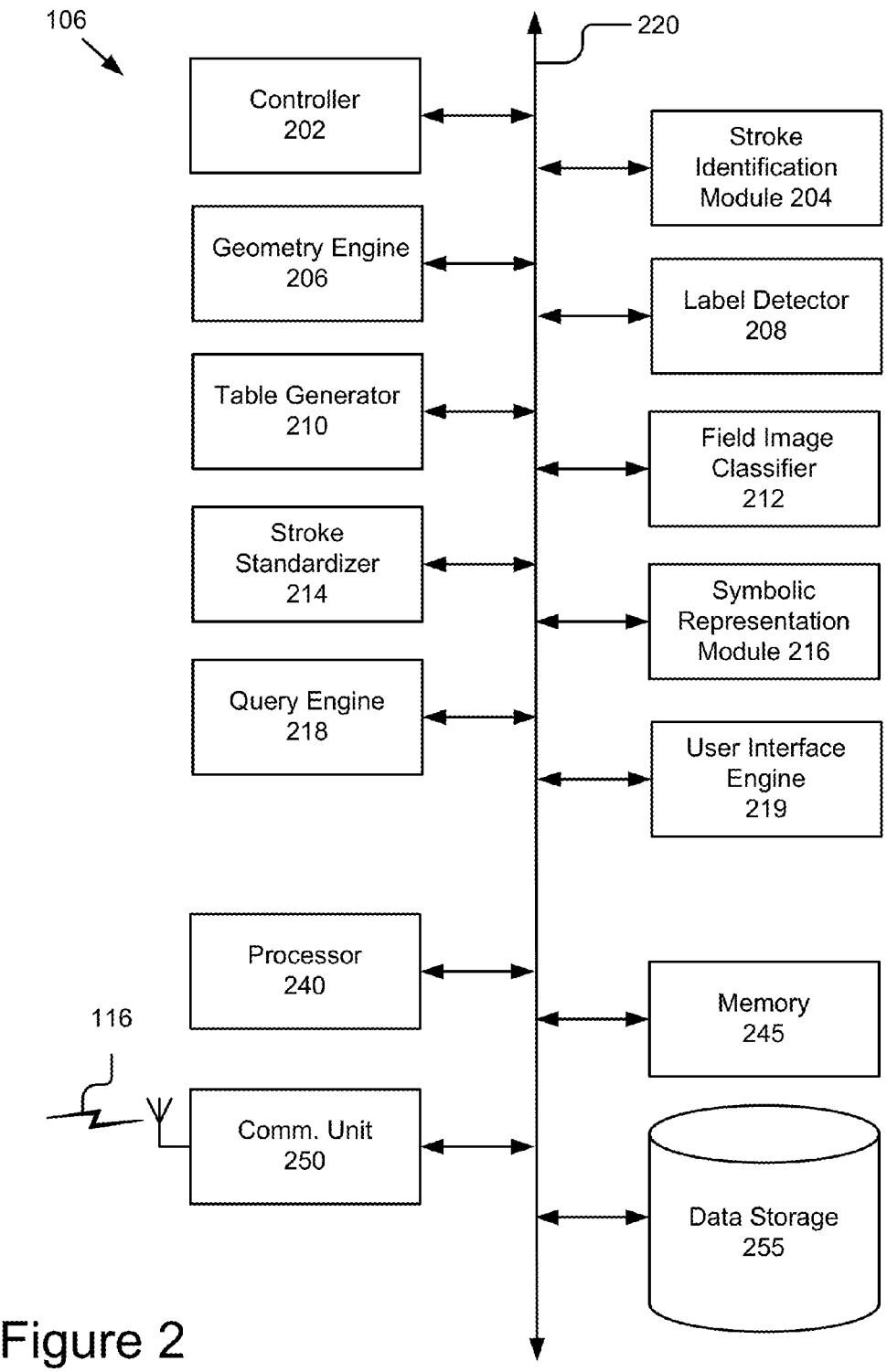
FIG. 2 is a block diagram illustrating one embodiment of an Image Based Document Management server in more detail.

Referring now to FIG. 2, an embodiment of the Image Based Document Management (IBDM) server 106 is illustrated. The IBDM server 106 includes a processor 240, a memory 245, a communication unit 250, data storage 255, a controller 202, a stroke identification module 204, a geometry engine 206, a label detector 208, a table generator 210, a field image classifier 212, a stroke standardizer 214, a symbolic representation module 216, a query engine 218 and a user interface engine 219.

The processor 240, the memory 245, the communication unit 250 and the data storage 255 are communicatively coupled to the bus 220. The bus 220 may represent one or more buses including an industry standard architecture (ISA) bus, a peripheral component interconnect (PCI) bus, a universal serial bus (USB), or some other bus known in the art to provide similar functionality.

The processor 240 comprises an arithmetic logic unit, a microprocessor, a general purpose controller or some other processor array to perform computations and provide electronic display signals to a display device. The processor 240 is coupled to the bus 220 for communication with the other components of the IBDM server 106. The processor 240 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 245 stores instructions and/or data that may be executed by processor 240. The memory 245 is coupled to the bus 220 for communication with the other components of the IBDM server 106. The instructions and/or data may comprise code for performing any and/or all of the techniques described herein. The memory 245 may be a dynamic random access memory (DRAM) device, a static random access memory (SRAM) device, flash memory or some other memory device known in the art. In one embodiment, the memory 245 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The communication unit 250 is hardware for receiving and transmitting data by linking the processor 240 to the network 104 and other processing systems. The communication unit 250 receives data such as form images from the plurality of portable computing devices 102a-102n and the image capture device 101. The communication unit 250 also receives requests for form images from the plurality of user devices 103a-103n. The communication unit 250 transmits information to the plurality of user devices 103a-103n. For example, the communication unit 250 transmits graphical data for displaying form images as a table to the user device 103. The communication unit 250 is coupled to the bus 220 for communication with the other components of the IBDM server 106.

In one embodiment, the communication unit 250 includes a port for direct physical connection to the user devices 103, the portable computing devices 102, the image capture device 101 or to another communication channel. For example, the communication unit 250 includes an RJ14 jack or similar port for wired communication with the image capture device 101. In another embodiment, the communication unit 250 includes a wireless transceiver for exchanging data with the portable computing devices 102 or any other communication channel using one or more wireless communication methods, such as IEEE 802.11, IEEE 802.16, Bluetooth® or another suitable wireless communication method.

In yet another embodiment, the communication unit 250 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 250 includes a wired port and a wireless transceiver. The communication unit 250 also provides other conventional connections to the network for distribution of files and/or media objects using standard network protocols such as TCP/IP, HTTP, HTTPS and SMTP as will be understood to those skilled in the art.

The data storage 255 is a non-transitory memory that stores data for the functionality of the IBDM server 106. The data storage 255 is coupled to the bus 220 for communication with other components of the IBDM server 106. The data storage 255 stores form images received from the portable computing devices 102 and the image capture device 101, field images, label images, metadata associated with the field and label images including positions of the field images, thresholds for defining relationships between field and label images, a label database, etc.

The controller 202 is software and routines for handling communications between the components of the IBDM server 106 and other components of the system 100. In one embodiment, the controller 202 is a set of instructions executable by the processor 240 to provide the functionality described below for handling communications between the components of the IBDM server 106 and other components of the system 100. In another embodiment, the controller 202 is stored in the memory 245 and is accessible and executable by the processor 240. In either embodiment, the controller 202 is adapted for cooperation and communication with the processor 240, the communication unit 250, the stroke identification module 204, the query engine 218, the user interface engine 219 and other components of the IBDM server 106 via the bus 220.

The controller 202 receives information via the communication unit 250 and transmits the information to the appropriate component of the IBDM server 106. For example, the controller 202 receives form images from the portable computing device 102. In another example, the controller 202 receives printed form images from the image capture device 101. The controller 202 transmits the form images and the printed form images to the stroke identification module 204. In another example, the controller 202 receives a request for the form images from the user device 103 and transmits the request to the table generator 210. In yet another example, the controller 202 receives user inputs from the user device 103 and transmits the user inputs to the query engine 218.

The controller 202 also receives information from other components of the IBDM server 106 and transmits the information to the appropriate device in the system 100 via the communication unit 250. For example, the controller 202 receives graphical data for generating a user interface from the user interface engine 216. The controller 202 transmits the graphical data to the user device 103.

The stroke identification module 204 is software and routines for identifying strokes in a form image. In one embodiment, the stroke identification module 204 is a set of instructions executable by the processor 240 to provide the functionality described below for identifying strokes in a form image. In another embodiment, the stroke identification module 204 is stored in the memory 245 and is accessible and executable by the processor 240. In either embodiment, the stroke identification module 204 is adapted for cooperation and communication with the processor 240, the controller 202, the geometry engine 206, and other components of the IBDM server 106 via the bus 220.

In one embodiment, the stroke identification module 204 receives form images including strokes from the controller 202. The stroke identification module 204 identifies pixels in a form image that represent strokes based on, for example, the pixel intensities, the color of the pixels, etc. The stroke identification module 204 also determines the position (for example, an x-y coordinate) of a stroke in the form image. In one embodiment, the stroke identification module 204 receives metadata along with the received form image that includes position information of the strokes in the form image. The stroke identification module 204 identifies the position of each stroke in the form image based on the metadata.

In another embodiment, the stroke identification module 204 receives printed form images including strokes from the controller 202. The received printed form images also include an unmarked printed form image (i.e., an image of the printed form without any strokes) as metadata. The stroke identification module 204 generates a resultant image for each printed form image by, for example, subtracting the printed form image with the unmarked printed form image. The stroke identification module 204 then identifies the position of each stroke within the corresponding printed form image using the resultant image.

Referring now to FIGS. 4A-4C, graphic representations of form images 400, 440, 480 received by the stroke identification module 204 are illustrated. In the illustrated examples, the form images 400, 440, 480 include strokes filled out on form 300 (see FIG. 3) by three different users using the portable computing device 102. The stroke identification module 204 identifies the strokes, (for example, the strokes that form the letters O 401, s 403, D 441, etc.) from the form images 400 and 440 and the position of each stroke in the form images 400 and 440.

The stroke identification module 204 then generates a stroke bounding box for a set of strokes in a single form image. In one embodiment, the stroke identification module 204 identifies strokes that overlap each other in the form image based on the position of the strokes and generates the stroke bounding box. Each stroke bounding box should be unique and not overlap much with other stroke bounding boxes. The stroke identification module 204 generates the stroke bounding box based on the distance between the strokes in the form image. In this embodiment, the distance between the positions of each stroke is within a threshold. In the above illustrated examples, the stroke identification module 204 generates stroke bounding boxes for the sets of strokes that form the words Oscar 405 and Mike 410 (see FIG. 4A), Dagon 445 (see FIG. 4B), the set of strokes that forms the X mark 485 (see FIG. 4C) etc.

Turning back to FIG. 2, the geometry engine 206 is software and routines for identifying a field in the form images and generating field images. In one embodiment, the geometry engine 206 is a set of instructions executable by the processor 240 to provide the functionality described below for identifying a field in the form images and generating field images. In another embodiment, the geometry engine 206 is stored in the memory 245 and is accessible and executable by the processor 240. In either embodiment, the geometry engine 206 is adapted for cooperation and communication with the processor 240, the stroke identification module 204, the label detector 208, the table generator 210 and other components of the IBDM server 106 via the bus 220.

The geometry engine 206 receives form images and the size and position information of the stroke bounding boxes in each form image from the stroke identification module 204. In one embodiment, the geometry engine 206 generates an overlay of the received form images. The geometry engine 206 identifies sets of strokes that overlap each other in the overlay based on the position information and classified them into a group. The geometry engine 206 designates the area encompassed by the group of overlapping strokes as a field in the form images as it infers that the area is used by the users for filling out information.

The geometry engine 206 generates a field bounding box that encompasses the group of overlapping strokes based on the size and position of the stroke bounding boxes of each set of strokes in the group of overlapping strokes. In one embodiment, the geometry engine 206 determines the center of the field bounding box by determining the average position (for example, geometric mean, harmonic mean, median, mode, etc.) of the stroke bounding boxes. In one embodiment, the geometry engine 206 determines the size of the field bounding box by determining the average size (for example, the geometric mean, harmonic mean, median, mode, etc.) of the stroke bounding boxes. The geometry engine 206 removes outliers, for example, by excluding stroke bounding boxes that would result in a field bounding box that is more than twice the size of the average stroke bounding box. In another embodiment, the geometry engine 206 determines the size of the largest stroke bounding box as the size of the field bounding box.

In one embodiment, geometry engine 206 identifies a geometric shape (for example, a line, a circle, a square, a rectangle, etc. that are traditionally used to fill out information in forms) from the overlay of the form images. The geometry engine 206 then generates a field bounding box that encompasses the geometric shape. In a further embodiment, the geometry engine 206 generates a field bounding box that encompasses the geometric shape and the group of overlapping strokes that is closest to the geometric shape.

Figure 5C:
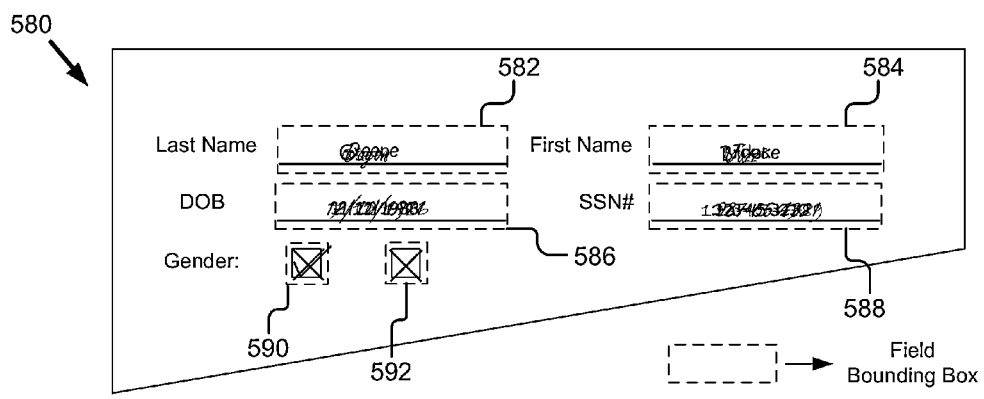
FIG. 5C is a graphic representation of an overlay of form images including field bounding boxes encompassing groups of strokes and geometric shapes.

Referring now to FIGS. 5A-5D, the above described process for generating field bounding boxes is illustrated. FIG. 5A illustrates a graphic representation of an overlay 500 of the three form images 400, 440, 480 from FIGS. 4A-4C. The geometry engine 206 identifies groups of strokes 505, 510, 515, 520, 525, 530 where the sets of strokes in each group overlap each other in the overlay. For example, the group of overlapping strokes 505 includes the set of strokes representing Oscar 405 (see FIG. 4A) and the set of strokes representing Dagon 445 (see FIG. 4B). FIG. 5B illustrates one embodiment of a graphic representation for the overlay 540 of the form images including field bounding boxes. The geometry engine 206 generates field bounding boxes, 545, 550, 555, 560, 565, 570 for each of the identified groups of overlapping strokes 505, 510, 515, 520, 525, 530 respectively.

FIG. 5C illustrates another embodiment of a graphic representation for the overlay 580 of the form images including field bounding boxes. The geometry engine 206 generates field bounding boxes 582, 584, 586, 588, 590, 592 that encompass the geometric shapes and the groups of overlapping strokes 505, 510, 515, 520, 525, 530 that are identified from the overlay of the form images.

Figure 5D:
FIG. 5D is a graphic representation for the overlay where each of the field bounding boxes in a form are organized as a row according to the reading order of the form.

FIG. 5D illustrates another embodiment of a graphic representation for the overlay 593 where each of the field bounding boxes in a form are organized as a row according to the reading order of the form (i.e. the order in which a person would complete the form by moving from left to right).

Turning back to FIG. 2, in another embodiment, the geometry engine 206 processes the received form images individually to generate the field bounding box. In this embodiment, the geometry engine 206 generates a field bounding box based on the size and the position of a first stroke bounding box encompassing a set of strokes in a first form image. The geometry engine 206 then determines if the position of a second stroke bounding box encompassing a set of strokes in a second form image matches or overlaps the position of the field bounding box. If there is a match or an overlap, the geometry engine 206 expands the size of the field bounding box to encompass the second stroke bounding box of the second form image. The geometry engine 206 repeats the process for all the received form images.

In one embodiment, the geometry engine 206 generates the field bounding box based on timing information of the strokes received as metadata with the form images. For example, the geometry engine 206 determines the sets of a group strokes that were filled out first in each of the three form images 400, 440, 480 and generates a field bounding box based on the size and position of the stroke bounding boxes encompassing the sets of strokes.

In one embodiment, the geometry engine 206 identifies a stroke in a form image that does not have any overlapping strokes in the overlay of form images. In one embodiment, if the size of the stroke is smaller than a threshold, the geometry engine 206 identifies the stroke as a stray marking. In a further embodiment, if the distance between the stroke and the closest field bounding box exceeds a threshold, the geometry engine 206 identifies the stroke as a stray marking. For example, the geometry engine 206 identifies a small stroke 413 (see FIG. 4A and FIG. 5A) near the margin of form image 400 as a stray marking. The geometry engine 206 then removes stray markings from the form image.

In another embodiment, the geometry engine 206 identifies outliers and removes them from the field bounding box. For example, if a user wrote text that overlaps with the field that would substantially increase the dimensions of the bounding box (e.g. by discarding outliers that are more than twice the size of the bounding box), the geometry engine 206 ignores the extraneous text. In one embodiment, the geometry engine 206 identifies a set of strokes in a form image that does not have any overlapping strokes in the overlay of form images. The geometry engine 206 designates the set of strokes as a note created by the user that submitted the form image, if the size of the set of strokes is larger than a threshold and/or if the distance between the set of strokes and the closest field bounding box exceeds a threshold. The geometry engine 206 generates a note image and sends it to the table generator 210.

Once a field bounding box representing a field in the form images is generated, the geometry engine 206 generates field images that include strokes from each of the received form images based on the size and the position of the generated field bounding box. For example, the geometry engine 206 crops a field image that includes the set of strokes Oscar 405 (see FIG. 4A) from the form image 400 and another field image that includes the set of strokes Dagon 445 (see FIG. 4B) from the form image 440 based on the size and position of the field bounding box 545 (see FIG. 5B). Similarly, the geometry engine 206 generates field images from the form images for each of the generated field bounding boxes. The geometry engine 206 then sends the form images, the field images and the position of the field images (i.e., the position of the field bounding box) within the form images to the label detector 208 and the table generator 210. In another embodiment, the geometry engine 206 saves the stroke metadata from all the strokes on each form that intersected the field bounding box and stores the stroke metadata in the data storage 255.

The label detector 208 is software and routines for identifying a label for a field image and generating a label image. In one embodiment, the label detector 208 is a set of instructions executable by the processor 240 to provide the functionality described below for identifying a label for a field image and generating a label image. In another embodiment, the label detector 208 is stored in the memory 245 and is accessible and executable by the processor 240. In either embodiment, the label detector 208 is adapted for cooperation and communication with the processor 240, the geometry engine 206, the table generator 210 and other components of the IBDM server 106 via the bus 220.

The label detector 208 receives form images and the field images associated with a field in the form images from the geometry engine 206. The label detector 208 also receives the position of the field images in the corresponding form images from the geometry engine 206. The label detector 208, based on the position of a field image, analyzes an area around (for example, to the left, right, top, bottom, etc.) a field image in the form image to identify a group of related pixels. The label detector 208 assigns the group of related pixels as the label for the field associated with the field image. The group of related pixels can represent any form of text, for example, one or more letters, one or more words, one or more numbers, punctuation marks, a symbol (for example: +, >, =, etc.), a logo, etc. Identifying characters and words in an image is a common preprocessing step in OCR and is well understood by persons with ordinary skill in the art.

In one embodiment, the label detector 208 identifies a letter or punctuation by determining one or more sets of pixels that are connected based on the pixel intensity, color, etc. The label detector 208 then identifies a word based on, for example, the spacing between sets of connected pixels. In one embodiment, if the label detector 208 identifies more than one group of related pixels in the form image, the label detector 208 assigns the group which is closest to the field image as the label. Segmenting letters and words is one of the first tasks in most OCR systems and is well understood.

Once the label is identified, in one embodiment, the label detector 208 generates a label image that includes the identified label from the unmarked form image. For example, the label detector 208 analyzes an area around the field image including the set of strokes Oscar 405 (see FIG. 4A) in the form image 400 and crops a label image that includes "Last Name." In one embodiment, the label detector 208 crops a label image from each of the received form images. In one embodiment, the label detector 208 then selects one label image to be associated with all field images based on the clarity of the label, noise in the label image, etc. The label detector 208 then sends the label image and the associated field to the table generator 210. In another embodiment, the label detector 208 crops the label image from an unmarked original form image.

The table generator 210 is software and routines for indexing the form images, the field images and the label images in the data storage 255. In one embodiment, the table generator 210 is a set of instructions executable by the processor 240 to provide the functionality described below for indexing the form images, the field images and the label images in the data storage 255. In another embodiment, the table generator 210 is stored in the memory 245 and is accessible and executable by the processor 240. In either embodiment, the table generator 210 is adapted for cooperation and communication with the processor 240, the data storage 255, the controller 202, the geometry engine 206, the label detector 208, field image classifier 212, the user interface engine 219 and other components of the IBDM server 106 via the bus 220.

The table generator 210 receives the form images, the field images and the position of each field image in the corresponding form image from the geometry engine 206. The table generator 210 indexes each form image with the field images that were generated from the form image. For example, the table generator 210 indexes the field image including the set of strokes Oscar 405 (see FIG. 4A) and the field image including the set of strokes Mike 410 (see FIG. 4A) with the form image 400. In one embodiment, the table generator 210 receives a note image that is identified in a form image by the geometry engine 206 and indexes the note image with the corresponding form image. The table generator 210 also the indexes the position of each field image within the form image with the field images. The table generator 210 also indexes field images based on the fields identified in the form images. For example, the table generator 210 indexes the form image including the set of strokes Oscar 405 (see FIG. 4A) and the field image including the set of strokes Dagon 445 (see FIG. 4B) as being associated with the same field. In one embodiment, the table generator 210 sends the field images associated with a field to the field image classifier 212.

The table generator 210 also receives label images for each identified field in the form images from the label detector 208. The table generator 210 indexes the label image with the field images associated with the field. For example, the table generator 210 indexes the label image including "Last Name" with the field images including the sets of strokes Oscar 405 and Dagon 445 (see FIGS. 4A-4B). In one embodiment, the table generator 210 sends a request to the symbolic representation module 216 and receives a new label image. The table generator 210 also indexes the new label image with the associated field images.

The field image classifier 212 is software and routines for classifying field images associated with a field. In one embodiment, the field image classifier 212 is a set of instructions executable by the processor 240 to provide the functionality described below for classifying the field images associated with a field. In another embodiment, the field image classifier 212 is stored in the memory 245 and is accessible and executable by the processor 240. In either embodiment, the field image classifier 212 is adapted for cooperation and communication with the processor 240, the data storage 255, the table generator 210, the symbolic representation module 216 and other components of the IBDM server 106 via the bus 220.

The field image classifier 212 receives the field images associated with a field in the form images from the table generator 210. The field image classifier 212 determines the features of the strokes included in each of the received field images. In one embodiment, the field image classifier 212 generates a feature vector from the identified stroke features. The stroke features include for example, a number of strokes, a stroke length, a stroke angle, a stroke curvature, stray markings, timing, pressure profile, etc. For example, the field image classifier 212 analyzes the field image including the strokes "7" and identifies the number of strokes as 2, the stroke length for the two strokes as 2 mm and 4 mm, the stroke angle for the two strokes as 0 degrees and 60 degrees, the stroke angle between the two strokes as 60 degrees, the stroke curvatures as linear or zero curvature, etc. The field image classifier 212 indexes the stroke features with the corresponding field image in the data storage 255.

The field image classifier 212 then analyzes the stroke features of the field images associated with the field to determine one or more similar patterns. The field image classifier 212 classifies the received field images into one or more groups based on the one or more patterns. For example, the field image classifier determines that three of the received field images that include strokes: "s," "S" and "S" have a similar pattern based on the respective stroke features. The field image classifier 212 classifies the three field images into one group. Similarly, the field image classifier 212 classifies two field images including strokes representing "m" and "M" into one group. The field image classifier 212 then generates a group identifier for each identified group and indexes each field image with the corresponding group identifier in the data storage 255.

In one embodiment, the field image classifier 212 generates an ordinal number as the group identifier. In this embodiment, the field image classifier 212 sends the field images in each group associated with a field to the symbolic representation module 216. The field image classifier 212 then generates the ordinal value for each group based on the symbolic information of the field images. For example, a first group of field images includes strokes "0" and "0" and a second group of field images includes strokes "5" and "5". The field image classifier 212 assigns an ordinal value of 1 for the first group and an ordinal value of 2 for the second group based on the symbolic information of the field images. Although the above example describes generating ordinal numbers for groups of field images that include strokes representing numbers, persons of ordinary skill will recognize that the field image classifier 212 can assign ordinal numbers for groups of field images that include strokes representing alphabets, words, dates, etc.

The stroke standardizer 214 is software and routines for generating a representative image for field images associated with a field. In one embodiment, the stroke standardizer 214 is a set of instructions executable by the processor 240 to provide the functionality described below for generating a representative image for field images associated with a field. In another embodiment, the stroke standardizer 214 is stored in the memory 245 and is accessible and executable by the processor 240. In either embodiment, the stroke standardizer 214 is adapted for cooperation and communication with the processor 240, the data storage 255, the symbolic representation module 216 and other components of the IBDM server 106 via the bus 220.

The stroke standardizer 214 retrieves field images associated with a field that are classified into a group from the data storage 255. The stroke standardizer 214 also retrieves and analyzes the stroke features that are indexed with the retrieved field images from the data storage 255. The stroke standardizer 255 determines a representative image for the group based on the stroke features. In one embodiment, the stroke standardizer 214 assigns the field image with the least number of stray markings as the representative image. In another embodiment, the stroke standardizer 212 assigns the field image that is least complicated, uses an average number of strokes or includes stroke features that are most similar to the other stroke features. In this embodiment, the stroke standardizer 214 determines the least complicated field image based on a combination of stroke features for example, the stroke lengths, number of strokes, stroke angle, stroke curvature, symmetry of the curves, etc. For example, the stroke standardizer 214 retrieves three field images that include strokes: "r," "R" and "r" from the data storage 255. The three field images are associated with the same field and are classified into one group by the field image classifier 212. In this example, the stroke standardizer 214 assigns the field image including the stroke "r" as the representative image for the group since it is the least complicated amongst the three field images.

In one embodiment, where there are multiple groups of field images associated with a field in the data storage 255 that convey the same information, the stroke standardizer 214 generates a representative image for each group of field images. For example, in a box where you indicate you read and understood the terms and conditions, users can input a tick mark, an x or a circle. The stroke standardizer 212 retrieves a first group of field images and a second group of field images that are associated with a single field from the data storage 255. The first group comprises four field images that include strokes representing a tick mark. The second group comprises two field images that include strokes representing a circle. In this embodiment, the stroke standardizer 212 assigns a first representative image for the first group and a second representative image for the second group. In another embodiment, the stroke standardizer 214 assigns a single representative image for both the first and the second group. In this embodiment, the stroke standardizer 214 assigns the group with the most number of field images as a representative group. The stroke standardizer 214 then selects a representative image from the representative group and assigns it as the representative image for all the field images associated with the field. In the above described example, the stroke standardizer 214 selects the representative image from the first group because the number of field images in the first group is higher than the second group.

The stroke standardizer 214 indexes the representative image with the corresponding field images in the data storage 255. In one embodiment, the stroke standardizer 214 sends the representative image to the symbolic representation module 216 and in response, receives a representative match. The stroke standardizer 214 also indexes the representative match with the corresponding field images in the data storage 255.

The symbolic representation module 216 is software and routines for generating symbolic information for field images and representative images. In one embodiment, the symbolic representation module 216 is a set of instructions executable by the processor 240 to provide the functionality described below for generating symbolic information for field images and representative images. In another embodiment, the symbolic representation module 216 is stored in the memory 245 and is accessible and executable by the processor 240. In either embodiment, the symbolic representation module 216 is adapted for cooperation and communication with the processor 240, the field image classifier 212, the stroke standardizer 214 and other components of the IBDM server 106 via the bus 220.

In one embodiment, the symbolic representation module 216 receives a group of field images from the field image classifier 214. The symbolic representation module 216 generates symbolic information (for example, machine encoded text such as American Standard Code for Information Exchange (ASCII)) for the field images by performing, for example, Optical Character Recognition (OCR), Optical Mark Recognition (OMR), handwriting recognition, pattern recognition, etc. The symbolic representation module 216 then sends the symbolic information for each field image to the field image classifier 212. In another embodiment, the symbolic representation module 216 receives a representative image from the stroke standardizer 214 and generates symbolic information. The symbolic representation module 216 then generates a representative match based on the symbolic information and sends the representative match to the stroke standardizer 214. For example, the symbolic representation module 216 receives a representative image that includes the stroke "Q," the symbolic representation module 216 generates a representative match as "Q" (i.e., machine encoded text) and sends it to the stroke standardizer 214.

The query engine 218 is software and routines for receiving user inputs, generating queries and instructing the user interface engine 219 to display graphical data. In one embodiment, the query engine 218 is a set of instructions executable by the processor 240 to provide the functionality described below for receiving user inputs, generating queries and instructing the user interface engine 219. In another embodiment, the query engine 218 is stored in the memory 245 and is accessible and executable by the processor 240. In either embodiment, the query engine 218 is adapted for cooperation and communication with the processor 240, the data storage 255, the controller 202, the user interface engine 219 and other components of the IBDM server 106 via the bus 220.

The query engine 218 receives user inputs submitted by a user on the user interface displaying form images in a table on the user device 103 from the controller 202. In one embodiment, the query engine 218 receives a user input for sorting the form images based on a field. The query engine 218 generates a query for retrieving the group identifiers that are indexed with the field images of the field. The query engine 218 then retrieves the search results from the data storage 255 and instructs the user interface engine 219 to sort the form images in the user interface based on the retrieved group identifier of each field image. In a further embodiment, the query engine 218 generates a query for retrieving ordinal numbers and instructs the user interface engine 219 to sort the form images in the user interface based on the ordinal numbers.

In another embodiment, the query engine 218 receives a user input for standardizing the field images associated with a field. The query engine 218 generates a query to retrieve a representative image for the field images from the data storage 255. In one embodiment, where the field images of the field are classified into multiple groups, the query engine 218 retrieves a representative image for each group. In another embodiment, the query engine generates a query and retrieves a representative match for the field images from the data storage 255. The query engine 218 then instructs the user interface engine 219 to replace the field images in the user interface with the representative image or the representative match.

The user interface engine 219 is software and routines for generating graphical data for displaying a user interface. In one embodiment, the user interface engine 219 is a set of instructions executable by the processor 240 to provide the functionality described below for generating graphical data for displaying a user interface. In another embodiment, the user interface engine 219 is stored in the memory 245 and is accessible and executable by the processor 240. In either embodiment, the user interface engine 219 is adapted for cooperation and communication with the processor 240, the table generator 210, the query engine 218 and other components of the IBDM server 106 via the bus 220.

In one embodiment, the user interface engine 219 receives an instruction including field images and label images from the table generator 210. The user interface engine 219 generates graphical data for displaying the field images and the label images as a table for the user device 103. In another embodiment, the user interface engine 219 receives instructions from the query engine 218 and generates graphical data to generate a new table. In another embodiment, the user interface engine 219 receives instructions to generate graphical data, such as forms, for the portable computing device 102. Once the graphical data is generated, the controller 202 transmits the graphical data to the user device 103 via the communication unit 250. A display device (not shown) coupled to the user device 103 renders the graphical data and displays the table to a user.

In one embodiment, the user interface engine 219 receives a request for viewing form images from the controller 202. The user interface engine 219 retrieves the field images and the label images that are indexed with the requested form images from the data storage 255. The user interface engine 219 then provides graphical data for displaying a user interface that presents the retrieved field images and label images in a table.

User Interfaces

Referring now to FIGS. 6-8, various examples of user interfaces for displaying form images as a table are illustrated. FIG. 6 illustrates a graphic representation of a user interface 600 that includes a plurality of form images in a table. In the illustrated example, the table generator 210 receives a request for viewing a plurality of form images from the user device 103 and instructs the user interface engine 219 to generate graphical data for providing the table. Each row in the table includes the field images generated from a single form image. For example, the cells in row 605 of the table comprise field images generated from the form image 400 (see FIG. 4A). The user interface engine 219 arranges the cells in each row such that each column of the table comprises field images that are associated with a single field. The user interface engine 219 then places the label image 610 associated with the field as the column header.

FIG. 7A illustrates a graphic representation of a user interface 700 for submitting a user input to standardize field images associated with a field. In the illustrated example, the user submits a user input to standardize the field images associated with the field 705 by checking the box 710 and clicking the button 715. The query engine 218 generates a query in response to receiving the user input and retrieves a representative image from the data storage 255. The query engine 218 then instructs the user interface engine 219 to update the user interface 700 displaying the table.

FIG. 7B illustrates a graphic representation of a user interface 750 that displays a field with standardized field images.

In response to receiving the instructions from the query engine 218, the user interface engine 219 generates graphical data to replace the field images of the field 705 with the representative image 740.

Figure 8A:
FIG. 8A illustrates a graphic representation of an example table for submitting user input to sort form images.

FIG. 8A illustrates a graphic representation of a user interface 800 for submitting a user input to sort form images based on a field. In the illustrated example, the user submits a user input to sort the form images (i.e., the rows of the table 600) based on the field 805 by checking the box 810 and clicking the button 815. The query engine 218 generates a query in response to receiving the user input and retrieves the ordinal numbers of the field images in the field 805. The query engine 218 then instructs the user interface engine 219 to update the user interface 800 displaying the table.

FIG. 8B illustrates a graphic representation of a user interface 850 that displays the table with rows sorted based on a field. In response to receiving the instruction from the query engine 218, the user interface engine 219 generates graphical data to sort the rows of the table based on the ordinal numbers of the field images in the field 805.

Methods

Figure 9:
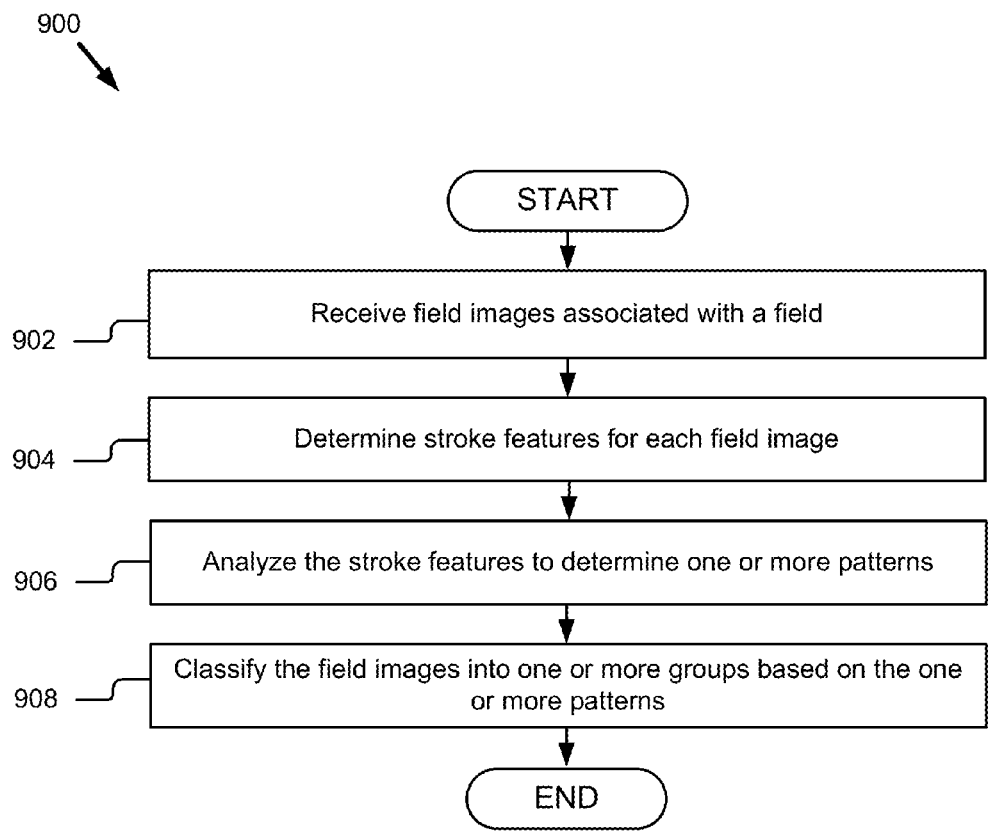
FIG. 9 is a flow diagram of one embodiment of a method for classifying field images associated with a field.
Figure 10:
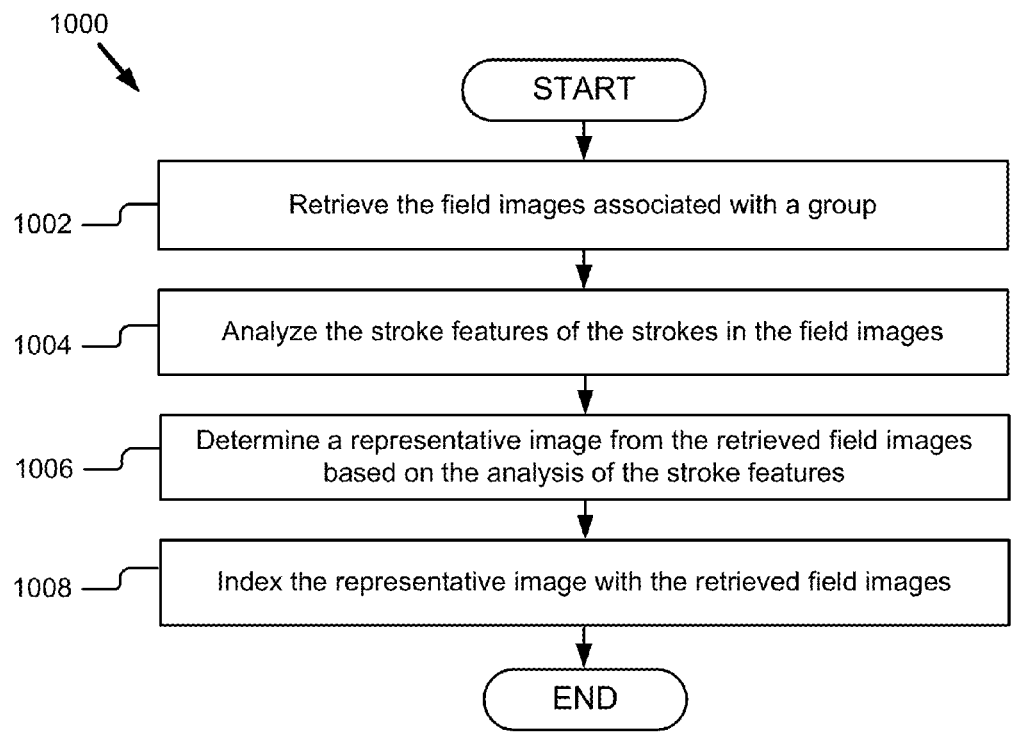
FIG. 10 is a flow diagram of one embodiment of a method for determining a representative match for a group of field images associated with a field.

Referring now to FIGS. 9-10, various embodiments of the methods will be described. FIG. 9 is a flow diagram of a method for classifying field images associated with a field. The IMBD server 106 includes a controller 202, a stroke identification module 204, a geometry engine 206, a label detector 208, a table generator 210, a field image classifier 212, a stroke standardize 214, a symbolic representation module 216, a query engine 218 and a user interface engine 219. The field image classifier 212 receives 902 field images associated with a field from the table generator 210. The field image classifier 212 determines 904 stroke features for each field image. For example, the field image classifier 212 determines a stroke length, stroke angle, number of strokes, etc., for each field image. The field image classifier 212 analyzes 906 the stroke features to determine one or more patterns. The field image classifier 212 then classifies 908 the field images into one or more groups based on the one or more patterns.

FIG. 10 is a flow diagram of a method for determining a representative image for a group of field images associated with a field. The stroke standardizer 214 retrieves 1002 the field images associated with a group from the data storage 255. The stroke standardizer 214 analyzes 1004 the stroke features of the strokes in the field images. The stroke standardizer 214 determines 1006 a representative image from the retrieved field images based on the analysis of the stroke features. For example, the stroke standardizer 214 determines the field image with the least number of stray markings as the representative image. The stroke standardizer 214 then indexes 1008 the representative image with the retrieved field images. In another embodiment, the stroke standardizer 214 saves the stroke metadata for the representative image in the data storage 255.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the in the following claims.

What is claimed is:

1. A computer-implemented method for classifying a plurality of field images, the method comprising:
   receiving the plurality of field images associated with a field;
   determining, with one or more processors, stroke features for each of the plurality of field images;
   analyzing, with the one or more processors, the stroke features to determine one or more patterns;
   classifying the plurality of field images into one or more groups based on the one or more patterns;
   retrieving field images in a first group from the one or more groups;
   determining a representative image from the retrieved field images based on the stroke features;
   replacing the field images of the first group with the representative image; and
   generating a table with the plurality of field images including the representative image for the field images that are classified as being part of the first group.

2. The method of claim 1, wherein the stroke features include at least one of a stroke length, a stroke curvature, a stroke angle, a number of strokes, timing, a pressure profile and stray markings.

3. The method of claim 1, further comprising:
   receiving a request for the plurality of field images from a user device; and
   providing the table to the user device.

4. The method of claim 1, further comprising:
   generating an ordinal number for each of the one or more groups; and
   sorting the plurality of form images in the table based on the one or more ordinal numbers.

5. The method of claim 1, wherein the representative image is selected based on having at least one of a least number of stray markings and being a least complicated field image.

6. The method of claim 1, further comprising:
   replacing the plurality of field images with the representative image.

7. The method of claim 1, further comprising generating a feature vector with the stroke features for each of the plurality of field images.

8. A system for classifying a plurality of field images, the system comprising:
   a field image classifier for receiving the plurality of field images associated with a field, determining stroke features for each of the plurality of field images, analyzing the stroke features to determine one or more patterns and classifying the plurality of field images into one or more groups based on the or more patterns;

a stroke standardizer for retrieving field images in a first group from the one or more groups, for determining a representative image from the retrieved field images based on the stroke features and for replacing the field images of the first group with the representative image; and a user interface engine for generating a table with the plurality of field images including the representative image for the field images that are classified as being part of the first group.

9. The system of claim 8, wherein the stroke features include at least one of a stroke length, a stroke curvature, a stroke angle, a number of strokes, timing, a pressure profile and stray markings.

10. The system of claim 8, further comprising a table generator coupled to the field image classifier, the table generator for receiving a request for the plurality of field images from a user device.

11. The system of claim 8, wherein the field image classifier further generates an ordinal number for each of the one or more groups.

12. The system of claim 11, wherein the user interface engine provides the table to the user device and sorts the plurality of form images in the table based on the one or more ordinal numbers.

13. The system of claim 8, wherein the representative image is selected based on having at least one of a least number of stray markings and being a least complicated field image.

14. The system of claim 8, wherein the stroke standardizer further replaces the plurality of field images with the representative image.

15. The system of claim 8, wherein the field image classifier further generates a feature vector with the stroke features for each of the plurality of field images.

16. A computer program product comprising a non-transitory computer useable medium including a computer readable program, wherein the computer readable program when executed on a computer causes the computer to:

receive a plurality of field images associated with a field;

determine stroke features for each of the plurality of field images;

analyze the stroke features to determine one or more patterns;

classify the plurality of field images into one or more groups based on the or more patterns;

retrieve field images in a first group from the one or more groups;

determine a representative image from the retrieved field images based on the stroke features;

replace the field images of the first group with the representative image; and generate a table with the plurality of field images including the representative image for the field images that are classified as being part of the first group.

17. The computer program product of claim 16, further causing the computer to:

receive a request for the plurality of field images from a user device; and provide the table to the user device.

18. The computer program product of claim 17, further causing the computer to:

generate a feature vector with the stroke features for each of the plurality of field images.

19. The computer program product of claim 16, further causing the computer to:

generate an ordinal number for each of the one or more groups; and sort the plurality of form images in the table based on the one or more ordinal numbers.

20. The computer program product of claim 16, wherein the representative image is selected based on having at least one of a least number of stray markings and being a least complicated field image.

* * * * *